US012475249B2

(12) United States Patent
Mondal et al.

(10) Patent No.: US 12,475,249 B2
(45) Date of Patent: Nov. 18, 2025

(54) METHOD AND SYSTEM FOR PROVIDING DATA PRIVACY IN SERVICE OPERATIONS

(71) Applicant: Tata Consultancy Services Limited, Mumbai (IN)

(72) Inventors: Sutapa Mondal, Pune (IN); Sachin Premsukh Lodha, Pune (IN); Rohit Gupta, Pune (IN); Rishabh Kumar, Pune (IN); Mangesh Sharad Gharote, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 51 days.

(21) Appl. No.: 18/744,827

(22) Filed: Jun. 17, 2024

(65) Prior Publication Data

US 2025/0005189 A1   Jan. 2, 2025

(30) Foreign Application Priority Data

Jun. 28, 2023   (IN) .............................. 202321043481

(51) Int. Cl.
*H04L 29/06*   (2006.01)
*G06F 21/62*   (2013.01)

(52) U.S. Cl.
CPC ................ *G06F 21/6218* (2013.01)

(58) Field of Classification Search
CPC ............. H04L 63/1483; H04L 63/1466; G06F 21/6214
See application file for complete search history.

(56) References Cited

U.S. PATENT DOCUMENTS

| | | | |
|---|---|---|---|
| 2020/0242623 A1* | 7/2020 | Savir | G06V 10/82 |
| 2022/0272124 A1 | 8/2022 | Zawadzki et al. | |
| 2022/0327541 A1* | 10/2022 | Seguritan | G06Q 20/4016 |
| 2022/0335155 A1 | 10/2022 | Zimmer et al. | |
| 2023/0053913 A1 | 2/2023 | De Souza et al. | |
| 2024/0080341 A1* | 3/2024 | Groth | G06F 21/604 |

* cited by examiner

*Primary Examiner* — Wasika Nipa
(74) *Attorney, Agent, or Firm* — Finnegan, Henderson, Farabow, Garrett & Dunner, LLP

(57) ABSTRACT

This disclosure relates generally to method and system for providing data privacy in service operations. Identifying risk arising from processing of user request in service operations is time consuming and monitoring insider threats is a difficult task. The method includes receiving a user request for a service comprising a plurality of sensitive attributes and further a vulnerability rating is assigned to each sensitive attribute. To mitigate the risk, the method estimates a disclosure proportion for the plurality of sensitive attributes and a masking operation is performed. Further, a sensitivity score is computed to allocate the user request to an agent associated with an agent registry with enabled data privacy and minimal data exposure. The agent is monitored by computing an agent mis-usability score to assess an insider threat risk. Additionally, a feedback alert is notified to autotune the plurality of privacy settings.

17 Claims, 8 Drawing Sheets

METHOD AND SYSTEM FOR PROVIDING DATA PRIVACY IN SERVICE OPERATIONS

PRIORITY CLAIM

This U.S. patent application claims priority under 35 U.S.C. § 119 to: Indian Patent Application No. 202321043481, filed on Jun. 28, 2023. The entire contents of the aforementioned application are incorporated herein by reference.

TECHNICAL FIELD

The disclosure herein generally relates to data privacy, and, more particularly, to method and system for providing data privacy in service operations.

BACKGROUND

Data privacy is a set of rules for how data should be acquired or processed based on the sensitivity and value of the data. Personal health information (PHI) and personally identifiable information (PII) are types of data that are often covered by data privacy. For example, finance, health, social security or identity numbers, names, dates of birth, and contact details. While data protection offers tools and regulations to actually limit access to the data, data privacy specifies who has access to the data. Companies are required to take steps to protect sensitive user data, and compliance requirements help to ensure that user privacy requests are privileged by businesses.

Many businesses focus on protecting data by providing role-based access control and authentication. But in service organizations, preserving privacy and detecting malicious authorized personnel is a challenging task. However, it might be difficult to protect privacy and identify authorized individuals who are acting maliciously in service organizations. Existing solutions lack the ability to prevent either purposeful or accidental data exposure to these authorized personnel. A quality service and on-time query resolution are impossible to deliver if the data is totally anonymized or hidden. However, determining the quantity of data disclosure that can be permitted to the authorized personnel without impairing the privacy and service operations performance requirements is a challenging task.

Advances in artificial intelligence (AI) are allowing organizations to more easily and accurately analyze large amounts of user for data privacy. But these new capabilities come with certain ethical issues that must be addressed. However, a major portion of the responsibility of data privacy falls to the employees who work with it. Poorly trained employees can easily misplace, expose, or misuse data, putting customers sensitive information at risk and opening companies to possible reprisal. Potentially it is essential to incorporate data privacy into service operations in order to maintain both privacy and critical performance metrics for the service.

SUMMARY

Embodiments of the present disclosure present technological improvements as solutions to one or more of the above-mentioned technical problems recognized by the inventors in conventional systems. For example, in one embodiment, a system for providing data privacy in service operations is provided. The system includes pre-configuring a plurality of privacy settings defined by a customer corresponding to one or more service operations in a service operations. The system receives a user request for a service comprising a plurality of sensitive attributes, wherein the user request is classified into a category among a plurality of categories, wherein the user request is assigned to an agent among a plurality of agents to provide resolution. Further, a vulnerability rating among a plurality of vulnerability ratings is assigned to each sensitive attribute among the plurality of sensitive attributes of the user request. Further, a disclosure proportion is estimated for the plurality of sensitive attributes based on the vulnerability rating corresponding to each sensitive attribute and a privacy factor. Furthermore, a masking operation over the plurality of sensitive attributes is based on the disclosure proportion when at least one sensitive attribute is a numerical character and a node from a generalization tree is selected close to the disclosure proportion when at least one sensitive attribute is a non-numerical character. The disclosure proportion determines a total number of numerical characters to be masked.

Further, a sensitivity score is computed for the user request based on the vulnerability rating assigned to each sensitive attribute and a cumulative privacy attribute score for the plurality of sensitive attributes over which the masking operation is performed. The user request is allocated based on the category to the agent among the plurality of agents associated with an agent registry, wherein the agent provides the resolution to the user request with enabled data privacy and minimal data exposure to the agent. Then, an agent mis-usability score is computed to assess an insider threat risk of the agent having access to the plurality of sensitive attributes associated with the user request, wherein a feedback alert is notified to autotune the plurality of privacy settings having the agent registry.

In another aspect, a method for providing data privacy in service operations is provided. The method includes for providing data privacy in service operations is provided. The system includes pre-configuring a plurality of privacy settings defined by a customer corresponding to one or more service operations in a service operations. The system receives a user request for a service comprising a plurality of sensitive attributes, wherein the user request is classified into a category among a plurality of categories, wherein the user request is assigned to an agent among a plurality of agents to provide resolution. Further, a vulnerability rating among a plurality of vulnerability ratings is assigned to each sensitive attribute among the plurality of sensitive attributes of the user request. Further, a disclosure proportion is estimated for the plurality of sensitive attributes based on the vulnerability rating corresponding to each sensitive attribute and a privacy factor. Furthermore, a masking operation over the plurality of sensitive attributes is based on the disclosure proportion when at least one sensitive attribute is a numerical character and a node from a generalization tree is selected close to the disclosure proportion when at least one sensitive attribute is a non-numerical character. The disclosure proportion determines a total number of numerical characters to be masked.

Further, a sensitivity score is computed for the user request based on the vulnerability rating assigned to each sensitive attribute and a cumulative privacy attribute score for the plurality of sensitive attributes over which the masking operation is performed. The user request is allocated based on the category to the agent among the plurality of agents associated with an agent registry, wherein the agent provides the resolution to the user request with enabled data privacy and minimal data exposure to the agent. Then, an agent mis-usability score is computed to assess an insider threat risk of the agent having access to the plurality of sensitive attributes associated with the user request, wherein a feedback alert is notified to autotune the plurality of privacy settings having the agent registry.

In yet another aspect, a non-transitory computer readable medium for providing data privacy in service operations is provided. The system includes pre-configuring a plurality of privacy settings defined by a customer corresponding to one or more service operations in a service operations. The system receives a user request for a service comprising a plurality of sensitive attributes, wherein the user request is classified into a category among a plurality of categories, wherein the user request is assigned to an agent among a plurality of agents to provide resolution. Further, a vulnerability rating among a plurality of vulnerability ratings is assigned to each sensitive attribute among the plurality of sensitive attributes of the user request. Further, a disclosure proportion is estimated for the plurality of sensitive attributes based on the vulnerability rating corresponding to each sensitive attribute and a privacy factor. Furthermore, a masking operation over the plurality of sensitive attributes is based on the disclosure proportion when at least one sensitive attribute is a numerical character and a node from a generalization tree is selected close to the disclosure proportion when at least one sensitive attribute is a non-numerical character. The disclosure proportion determines a total number of numerical characters to be masked or node to which a non-numerical sensitive attribute need to be generalized.

Further, a sensitivity score is computed for the user request based on the vulnerability rating assigned to each sensitive attribute and a cumulative privacy attribute score for the plurality of sensitive attributes over which the masking operation is performed. The user request is allocated based on the category to the agent among the plurality of agents associated with an agent registry, wherein the agent provides the resolution to the user request with enabled data privacy and minimal data exposure to the agent. Then, an agent mis-usability score is computed to assess an insider threat risk of the agent having access to the plurality of sensitive attributes associated with the user request, wherein a feedback alert is notified to autotune the plurality of privacy settings having the agent registry.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
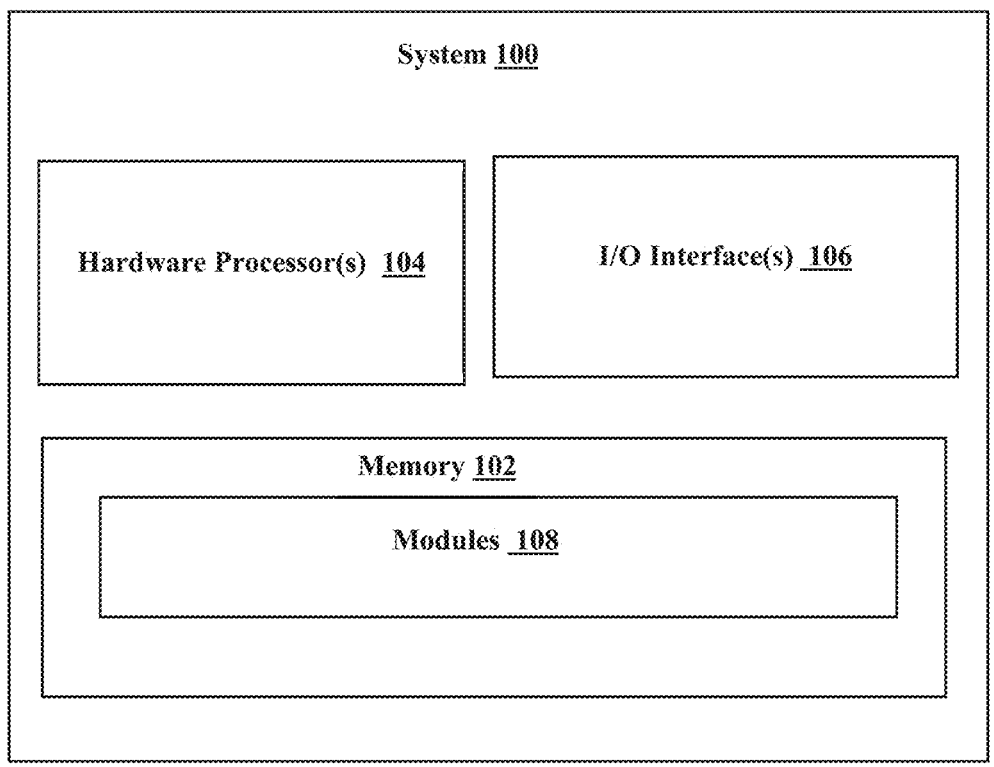
FIG. 1 is an illustrative system (alternatively referred as data privacy risk assessment system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Mitigating scenarios of user data breach due to insider threat is one of the major concerns for organizations. Monitoring, detecting, and devising preventive measures for insider threat in service operations is a challenging task. A service operations ecosystem is characterized by a pool of authorized and skilled agents who collectively support the service needs of the user or customer. System admin and end-users define these stakeholders. Herein, these service needs can be in the form of email requests or tickets or user request or tasks and thereof which comprises of a user request belonging to a particular category along with details of the user. The information contained in such user request can be sensitive in nature and leakage of such sensitive information can impact an individual data privacy and organization reputation.

Existing methods attempt to manage such insider threat scenarios by placing various security measures. However, controlling an agent cognitive abilities of when they have the potential to act maliciously remains a potential challenge. Existing methods of data masking or quantifying risk lack the ability to address the problem in context to the information flow in service operations. The resolution time for providing resolution to the user request may also increase if sensitive data is partially or completely masked, which could have an impact on key performance indicators (KPI) for service operations. Agents may also be unable to handle user request if sensitive data is partially or completely masked. Thus, partial masking in a controlled manner is important to avoid unnecessary disclosure of some information. Existing methods are unable to state the impact of privacy preservation methods on the service operations and does not provide any privacy preserving mechanism to address this challenging problem.

As used herein, the term "sensitive information" or "sensitive content" or "sensitive attributes" includes any information or content or attributes that is identified by an individual or organization as being only intended to be seen/viewed by at least one agent authorized by the customer or the user.

Embodiments herein provide a method and system for providing data privacy in service operations. The system may be alternatively referred as a privacy data risk assessment system. The system enables providing risk associated with an agent during service operations to mitigate insider threat risk when addressing a user request during service operations. The system receives the user request from at least one user and an agent is assigned to provide resolution for the user request. The method computes a sensitivity score for a plurality of sensitive attributes associated with the user request and evaluates risks associated with the agent being exposed to the plurality of sensitive attributes of the user request. According to a permissible degree of disclosure percentage over the plurality of sensitive attributes to be exposed to the agent, the method of the present disclosure recommends privacy factor masking. The method of the present disclosure recommends masking based on allowable degree of disclosure proportion over the plurality of sensitive attributes to be exposed to the agent. Furthermore, based on the user request and the agent, malicious exposure patterns are identified for monitoring insider threat scenarios. Also, the system and method of the present disclosure is robust and scalable in determining risk of the agent as an insider threat accurately and providing a feedback alert to autotune privacy settings. The disclosed system is further explained with the method as described in conjunction with FIG. 1 to FIG. 6 below.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 is an illustrative system (alternatively referred as data privacy risk assessment system), in accordance with some embodiments of the present disclosure. In an embodiment, the batch processing system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Figure 2:
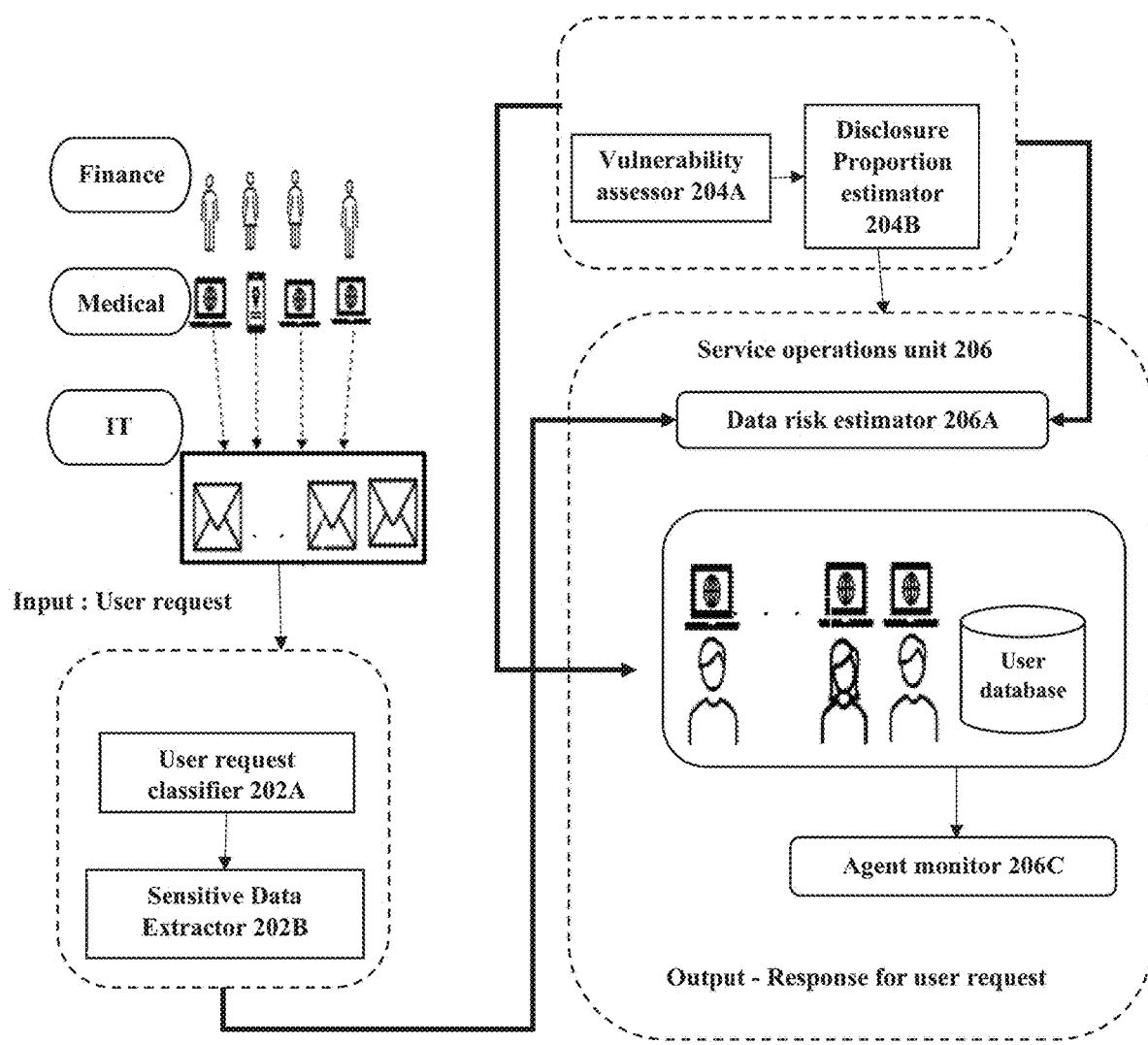
FIG. 2 illustrates a block diagram of an example data privacy risk assessment system for assessing the data privacy risks associated with a user request, in accordance with an embodiment of the present disclosure.

In an embodiment, the memory 102 includes a plurality of modules 108 can also include various sub-modules as depicted in FIG. 2. such as a pre-processing unit 202, a privacy configuration unit 204 and a service operation unit 206. The plurality of modules 108 include programs or coded instructions that supplement applications or functions performed by the system 100 for executing different steps involved in the process of providing data privacy in service operations of the system 100. The plurality of modules 108, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 108 can be used by hardware, by computer-readable instructions executed by the one or more hardware processors 104, or by a combination thereof.

The memory 102 may comprise information pertaining to input(s)/output(s) of each step performed by the processor(s) 104 of the system 100 and methods of the present disclosure. Functions of the components of system 100, for identifying malicious agent while handling user request having at least one sensitive attribute, are explained in conjunction with FIG. 2, FIG. 3A and FIG. 3B providing flow diagram, architectural overviews, and performance analysis of the system 100.

FIG. 2 illustrates a block diagram of an example data privacy risk assessment system for assessing the data privacy risks associated with a user request, in accordance with an embodiment of the present disclosure. The system 200 may be an example of the system 100 (FIG. 1). In an example embodiment, the system 200 may be embodied in, or is in direct communication with the system, for example the system 100 (FIG. 1). In an embodiment, the system 200 may be alternatively referred as a data privacy risk assessment system. The system 200 includes a pre-processing unit 202, a privacy configuration unit 204 and a service operations unit 206.

Referring to an example 1, an organization may operate with a help desk service operations to address resolutions related to a category. The employees or the user associated with the help desk service operations may log a user request via email, and thereof. The service requests can be in the form of email or user request or user tasks and thereof which comprises of a query belonging to the category along with user details. The category may include for example a finance, a human resources, a medical, an information technology and thereof.

The pre-processing unit 202 includes a user request classifier 202A and a sensitive data extractor 202B.

The classifier 202A receives the user request from the user associated with organizational products and related services and the like. The user request classifier 202A classifies the user request corresponding to the category from a plurality of categories predefined by a customer or the organization where the system 200 is being deployed.

The sensitive data extractor 202B extracts a plurality of sensitive attributes associated with the user request. The plurality of sensitive attributes may include a personal information, a demographic information, a credit card number, a date of birth and the like.

The privacy configuration unit 204 includes a vulnerability assessor 204A and a disclosure proportion estimator 204B. The privacy configuration unit 204 is deployed into the service operations.

The vulnerability assessor 204A is configured with a plurality of privacy settings defined by the customer corresponding to one or more service operations.

The disclosure proportion estimator 204B estimates a disclosure proportion for the user request associated with the plurality of sensitive attributes and a masking operation is performed over each sensitive attribute.

The service operations unit 206 includes a data risk estimator 206A, an agent allocator 206B and an agent monitor 206C.

The data risk estimator 206A estimates privacy data risk exposure that can happen due to the presence of the plurality of sensitive attributes in the user request. Each user request is computed with a sensitivity score by the data risk estimator 206A which is a measure of the gravity of the potential impact the data privacy associated with the user request.

The agent allocator 206B allocates the user request to an available agent from a plurality of agents with minimal data exposure. This essentially regulates the flow of the user request in the system to mitigate insider threat scenarios considering agent expertise, available agents to service the user request, response time and amount of data exposure.

The agent monitor 206C alerts the privacy configuration unit 204 to monitor the agent pattern that can be malicious while servicing the user request.

Figure 3A:
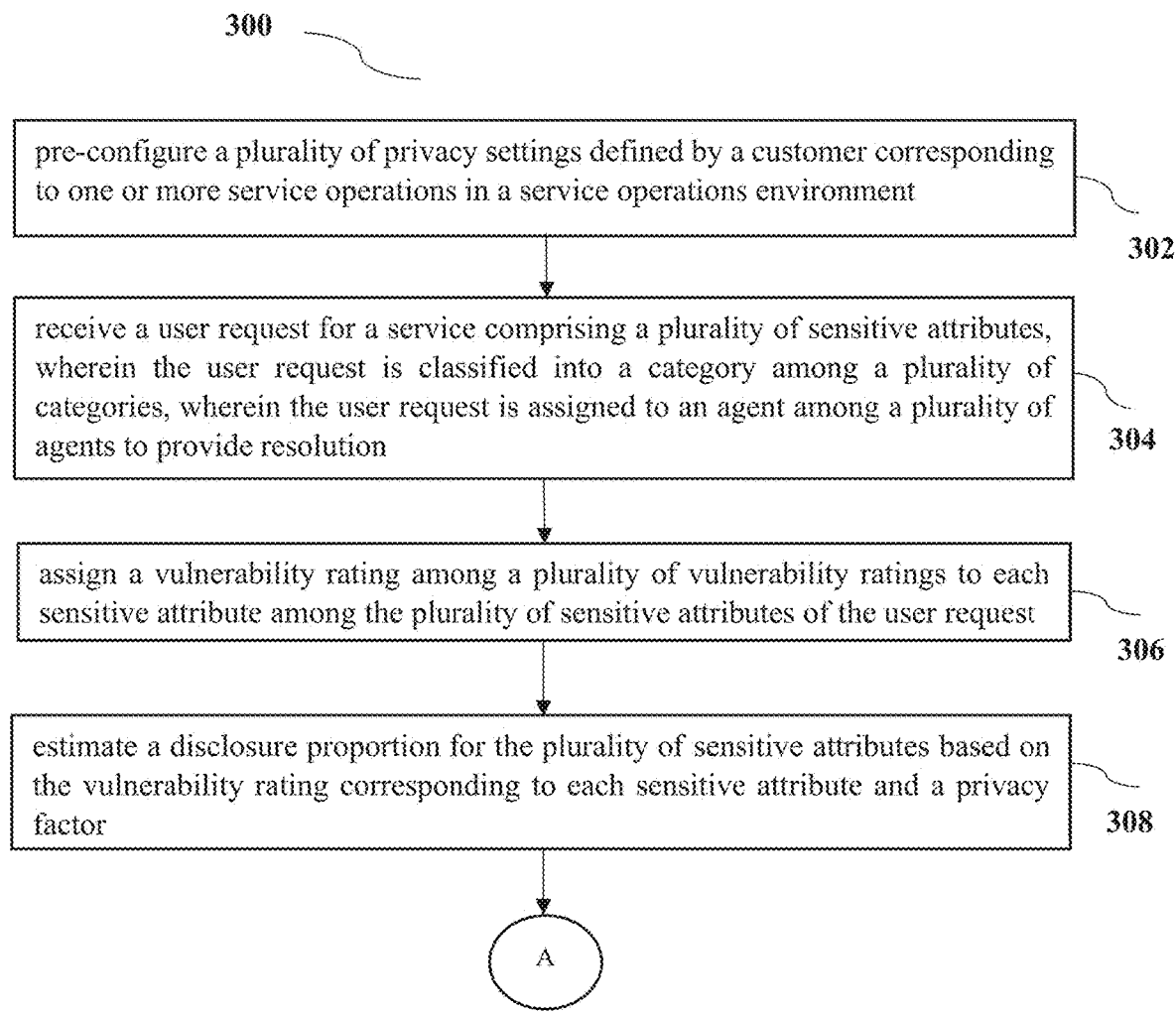
FIG. 3A and FIG. 3B (collectively referred as FIG. 3) depicts a flow diagram of an example process for providing data privacy protection for user sensitive attributes associated with the user request using the system of FIG. 1, in accordance with an embodiment of the present disclosure.
Figure 3B:
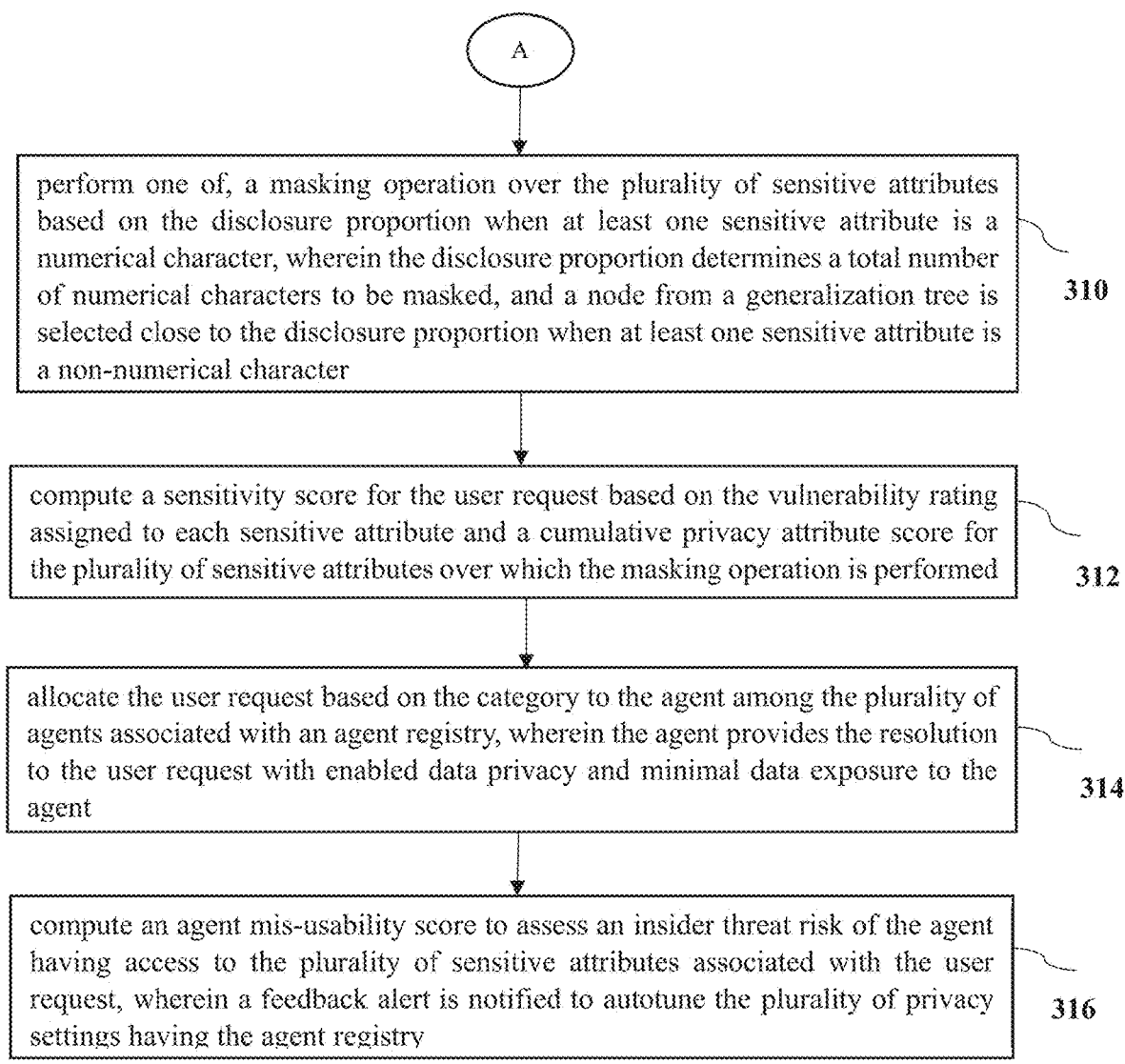
Figure 6:
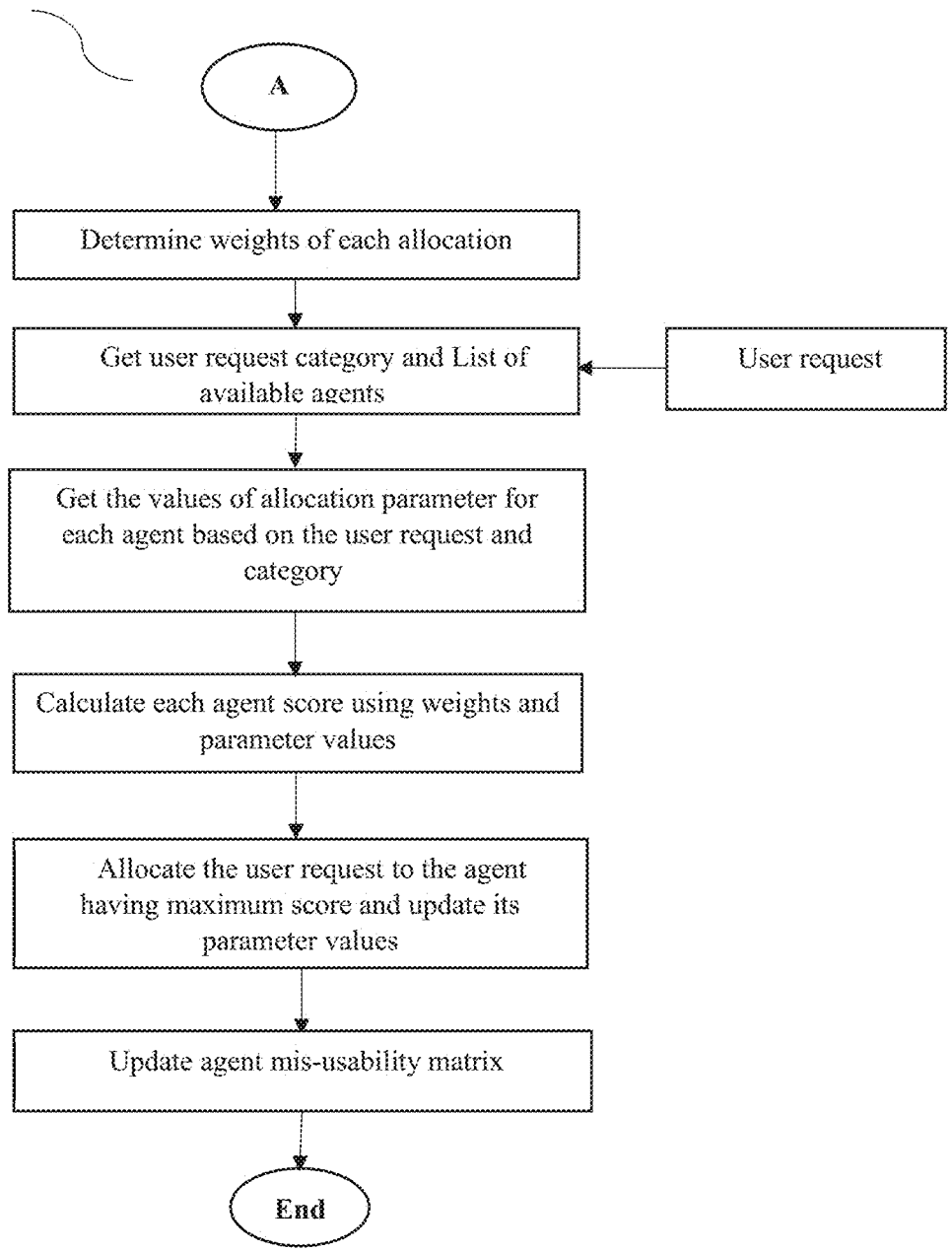
FIG. 6 is an example flow for monitoring agent to assess an insider threat risk using the system of FIG. 1, in accordance with an embodiment of the present disclosure.

FIG. 3A and FIG. 3B (collectively referred as FIG. 3) depicts a flow diagram of an example process for providing data privacy protection for user sensitive attributes associated with the user request using the system of FIG. 1, in accordance with an embodiment of the present disclosure. In an embodiment, the system 100 comprises one or more data storage devices or the memory 102 operatively coupled to the processor(s) 104 and is configured to store instructions for execution of steps of a method 300 by the processor(s) or one or more hardware processors 104. The steps of the method 300 of the present disclosure will now be explained with reference to the components or blocks of the system 100 as depicted in FIG. 1 through FIG. 2, and the steps of flow diagram as depicted in FIG. 3A, FIG. 3B and FIG. 6. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 a one or more hardware processor enable pre-configuring a plurality of privacy settings defined by a customer corresponding to one or more service operations in a service operations. Initially the service operations are deployed with the privacy configuration unit 204 comprising a vulnerability assessor 204A and a disclosure proportion estimator 204B. The vulnerability assessor 204A is pre-configured with a plurality of privacy settings defined by the customer corresponding to one or more service operations. The disclosure proportion estimation 204B estimates a disclosure proportion.

Referring to an example user request (Table 1) scenario of service operations, the user logs into the service operations and logs the user request related to any application, products, services and thereof. Typically, in this scenario, there are several users who can raise essentially tasks or user request related to any of the plurality of categories comprising a finance, a vendor management, a payroll, a healthcare, an insurance, an IT, and the like services. For example, the user request may be as described below,

TABLE 1

Example user request

Hi, I am Robert Sullivan and from 4181 Teresa Gardens Davistown, OR 09585, I am having trouble with my medical claim, my employee ID is EMP442-70-7288 and amount was $1,542.54. The payment was made through my credit card 40256106077034. My other details such as designation is Surgeon and my email id if erica07@yahoo.com and postal code is 73999. Please resolve my issue asap.

Referring to the steps of the method 300, at step 304 the one or more hardware processors receives a user request for a service comprising a plurality of sensitive attributes, wherein the user request is classified into a category among a plurality of categories, wherein the user request is assigned to an agent among a plurality of agents to provide resolution. From the above example the plurality of sensitive attributes includes Name of the employee "Robert Sullivan and from" address "4181 Teresa Gardens Davistown", employee ID ", Employee ID is EMP442-70-7288", payment amount "$1,542.54.", credit card number "40256106077034", email ID "erica07@yahoo.com", and postal code "73999". The method extracts the plurality of sensitive attributes in the below format, $$\left\{\begin{array}{c} 7399\text{: "Zip code"} \\ \textit{Rober Sullivan}\text{": "name"} \\ 4181\ \textit{Teresa Gardens Davistown},\ \text{OR 09585": "address"} \\ \$1,542.54\text{: money} \\ 40256106077034\text{: credit card number} \\ \text{"Surgeon": "job"} \\ \textit{"erica07@yahoo.com"}\text{: "email"} \end{array}\right\}$$

The pre-processing unit 202 receives the user request as input and the user request classifier 202A classifies each user request into at least one category among the plurality of categories and are directed to at least one agent from a plurality of agents available for providing resolution. De-risking the IT operations has become essential with the use of hybrid modes of operations. In such hybrid mode, the plurality of agents may work remotely, on-site, or even be outsourced to a third party, increasing the risk of insider threats and the likelihood of a privacy data breach where both users' privacy and an organization's reputation are at risk.

Further, the sensitive data extractor 202B of the pre-processing unit 202 extracts at least one sensitive attribute associated with the user request. The plurality of sensitive attributes includes at least one personal information and the like.

Referring to the steps of the method 300, at step 306 includes assigning via the one or more hardware processors, a vulnerability rating among a plurality of vulnerability ratings to each sensitive attribute among the plurality of sensitive attributes of the user request.

The vulnerability assessor 204A of the privacy configuration unit 204 fetches the output of the sensitive data extractor 204B as input and assigns a vulnerability rating to each sensitive attribute.

Each sensitive attribute is rated on a defined scale and the vulnerability rating is a degree of damage associated with disclosure of each sensitive attribute when exposed to a malicious agent. Each vulnerability rating are scaled with the help of subject expert and thorough examination. Once each sensitive attribute has been assigned, at least one vulnerability rating is applied across the complete application lifecycle. The plurality of sensitive attributes are rated on a defined scale that includes as Very High-5, High-4, Medium-3, Low-2 as described in Table 2,

TABLE 2

Vulnerability Rating

| Vulnerability Rating | Description |
| --- | --- |
| Very High-5 | Direct identifier, disclosure can make user directly vulnerable to Identity Disclosure (IDD) attack. |
| High-4 | Disclosure in combination with other attribute can lead to Identity Disclosure (IDD) attack. |
| Medium-3 | Disclosure in combination with more attribute can lead to Sensitive attribute disclosure (SAD). |
| Low -2 | Disclosure can tell about Membership attribute disclosure (MSD). |
| Very Low -1 | Disclosure does not pose any threat. |

The Identity Disclosure (IDD) attack is an identity disclosure indicates that the subject is clearly identifiable, and information can be used to conduct identify theft by impersonation. The Sensitive attribute disclosure (SAD) is a kind of sensitive attribute indicating sensitive information, such as a sickness, personal health information, ailments can be utilized to learn more personal information about the subject. The membership disclosure (MSD) means that if a subject characteristic may be used to understand from sensitive information such as a database of financial defaulters and the like.

Referring to the steps of the method 300, at step 308 the one or more hardware processors estimate a disclosure proportion for the plurality of sensitive attributes based on the vulnerability rating corresponding to each sensitive attribute and a privacy factor.

For the above example Table 1, the disclosure proportion estimator 204B (referring now to FIG. 4A) of the privacy configuration unit 204 estimates the disclosure proportion for the plurality of sensitive attributes by obtaining the vulnerability rating corresponding to each sensitive attribute associated with the user request. For example the vulnerability rating may be, Very High-5 for $1,542.54:money and 40256106077034:credit card number, Medium-3 for 7399: "Zip code" and "Surgeon": "job", Low-2 for "erica07@yahoo.com": "email" and 7399: "Zip code", High-4 for Robert Sullivan ": "name" and 4181 Teresa Gardens Davistown, OR 09585": "address".

Further, the privacy factor is computed for the plurality of sensitive attributes associated with the user request. The privacy factor is a numerical value ranging between zero and one [0,1], based on the disclosure proportion exposure to each agent. Here, a least risk is tagged to the agent if the privacy factor is close to one and a high risk is tagged to the agent if the privacy factor is close to zero.

Privacy factor is defined as a function of the sensitivity score (S) of the maximum number of sensitive attributes an agent can accumulate the example user request scenario in equation 1, $$\text{privacy factor} = 1 - \frac{S}{S_{max}} \qquad \text{equation 1}$$

Where, $S_{max}$ is the total sensitive score when disclosure proportion of all the attributes are 1. The sensitivity score of the user request becomes sensitive score (S).

Further an optimization model is generated to compute the disclosure proportion for the plurality of sensitive attributes associated with the user request based on the privacy factor value. The privacy factor determines the disclosure proportion for each sensitive attribute based on corresponding vulnerability rating. Based on the associated vulnerability rating, the privacy factor value establishes the disclosure proportion for each sensitive attribute. The privacy factor governs the degree of damage an agent can cause if they improperly use the plurality of sensitive attributes associated with the user request.

Referring to the above example user request, assuming the system admin wants to maintain a privacy factor of 0.95. Now the optimization model (referring now to FIG. 4B) described below comes with the disclosure proportion of attributes belonging to same vulnerability class having same vulnerability rating and the privacy factor is used to obtain the number of characters to be masked. The disclosure proportion is estimated based on each vulnerability rating and the privacy factor. The method assigns one disclosure proportion to each sensitive attribute having the same vulnerability rating.

The objective of the optimization model is described in equation 2, and their corresponding constraints in equation 3 and equation 4, $$\max \sum_v x_v \qquad \text{equation 2}$$

where,
V=vulnerability rating
$x_v$=Disclosure proportion of the plurality of sensitive attribute having vulnerability rating v
$A_{v_1} \ldots A_{v_2}$=Set of attributes having vulnerability rating v
F(.)=Sensitivity score function
$T=\Sigma_{i=1}^{5} v_i$ Herein the variable $x_v$ gives the disclosure proportion of each sensitive attribute having vulnerability rating v as depicted in equation 2. The goal is to maximize the disclosure proportion of each sensitive attribute without violating the privacy factor such that it allows maximum possible disclosure for each attribute to cater both user request resolution and privacy requirements.

Moreover, the objective function of the mathematical model given in equation 2 is to maximize the sum of disclosure proportion of each vulnerability rating. The constraints in equation 3 and equation 4 ensures that the sensitivity score does not exceed the privacy factor.

$$F(x_v, V, A_{v_1}, \ldots A_{v_4}) \leq (1 - pf) * S_{max} \quad \text{equation 3}$$

$$\left(1 + \frac{v_5}{T}\right)x_{v_5} \leq \ldots \leq \left(1 + \frac{v_1}{T}\right)x_{v_1} \quad \text{equation 4}$$

The function F(.) in constraint calculates the sensitivity score for the given vulnerability rating and the disclosure proportion of the user request. The constraints depicted in equation 3 and equation 4 ensures that the disclosure proportion of higher vulnerability rating of each sensitive attributes must not exceed that of the lower vulnerability rating of each sensitive attributes. Also, ensuring that the disclosure proportion values have a defined range as per the use case of the application.

Further, the disclosure proportion estimator 204B of the privacy configuration unit 204 determines the amount of information to be disclosed or masked over each sensitive attribute based on the user request resolution. The disclosure proportion is estimated for each sensitive attribute based on at least one vulnerability rating and allowable privacy factor in the system 100. Masking is performed over each sensitive attribute based on the disclosure proportion.

Referring to the steps of the method 300, at step 310 the one or more hardware processors perform one of a masking operation over the plurality of sensitive attributes based on the disclosure proportion when at least one sensitive attribute is a numerical character, wherein the disclosure proportion determines a total number of numerical characters to be masked, and a node from a generalization tree is selected close to the disclosure proportion when at least one sensitive attribute is a non-numerical character.

Figure 4A:
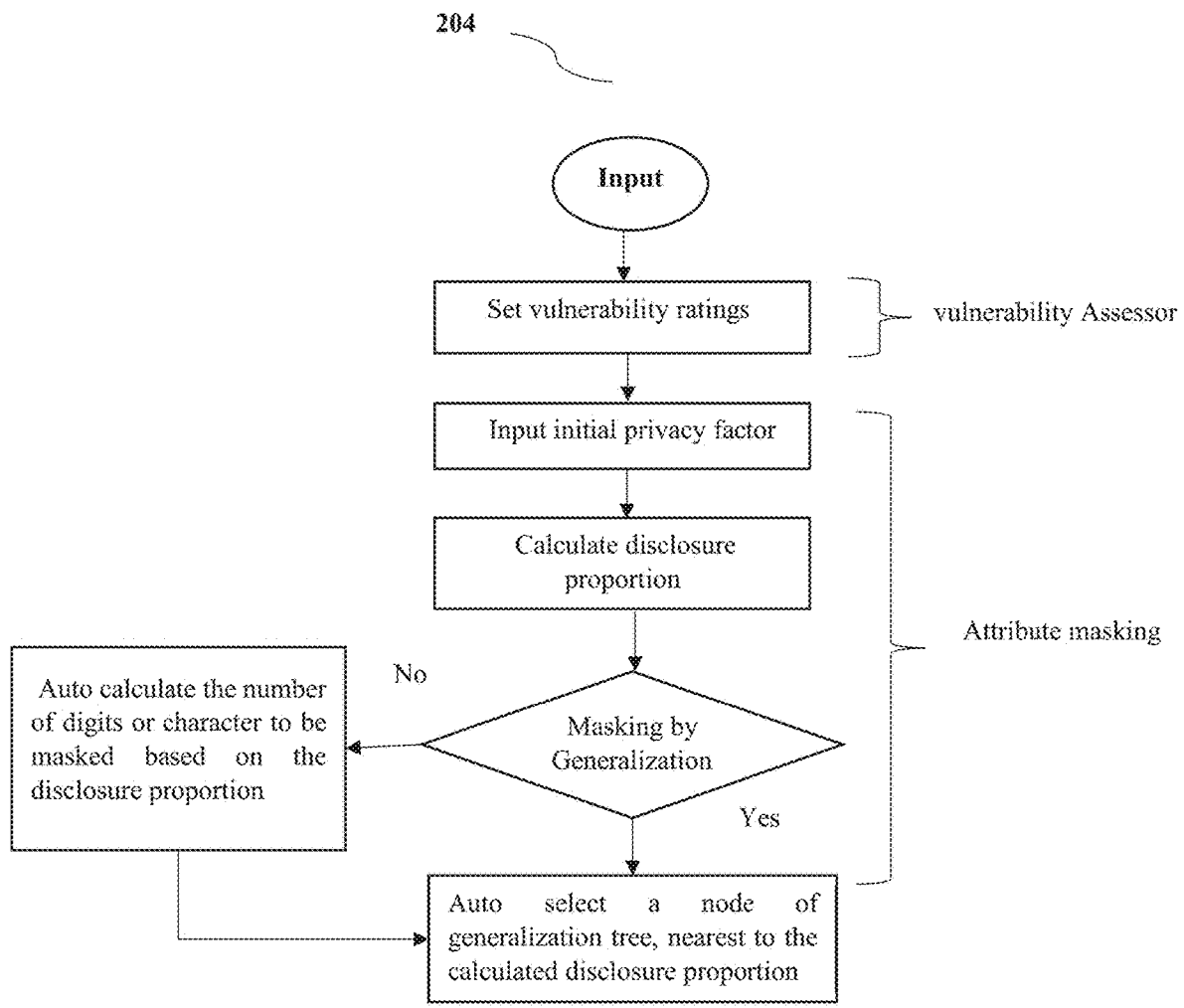
FIG. 4A is an example privacy configuration unit for managing privacy configurations using the system of FIG. 1, in accordance with an embodiment of the present disclosure.
Figure 4B:
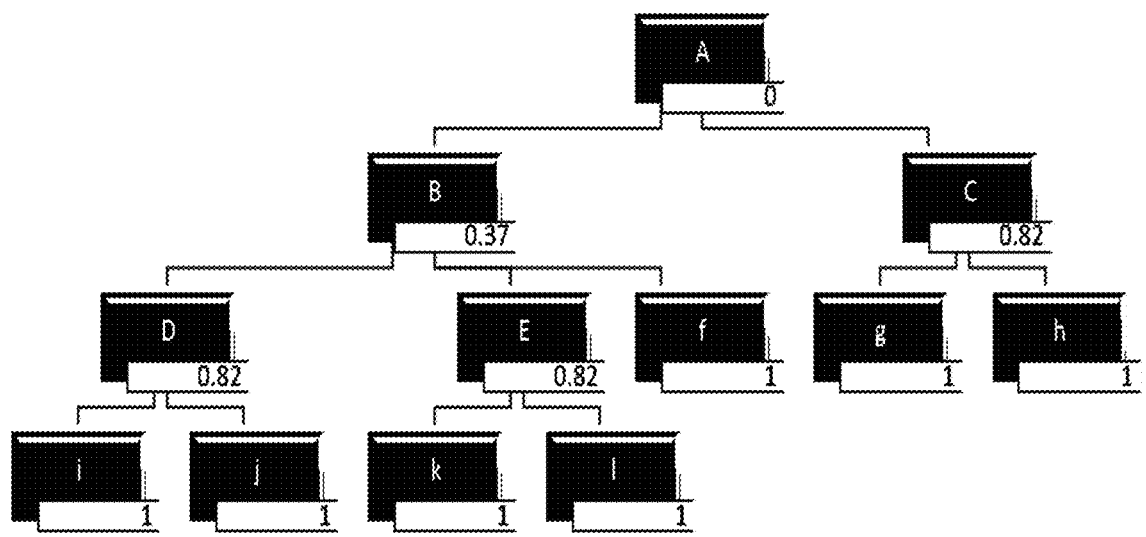
FIG. 4B is an example generalization tree of each sensitive attribute associated with the user request indicating a disclosure proportion at each node for masking with a privacy factor and a manual masking using the system of FIG. 1, in accordance with an embodiment of the present disclosure.

Referring now FIG. 4B based on the estimated values of the disclosure proportion, the masking operation is performed over each sensitive attribute of the user request. If the user request includes at least one character as numerical or non-numerical as the plurality of sensitive attributes, the disclosure proportion is estimated to perform masking as represented in equation 5, Total number of masked characters = equation 5

(1 − disclosure proportion (ρ)) * total number of characters

The calculated number of numerical characters and the number of characters of the plurality of sensitive attributes are masked from right to left. As most commonly the last parts of the attributes are required of user request resolution.

Each node in the generalization trees is known with disclosure proportion. Now, a node from the generalization tree is chosen for masking such that each sensitive attribute disclosure proportion is close to the node and less than the estimated value of the disclosure proportion. Every Node in the generalization tree has a corresponding disclosure proportion. Given the learned disclosure proportion the level nearest to the learned value and the appropriate node is then chosen.

In another embodiment, the disclosure proportion may be determined manually by an administrator expert based on the plurality of sensitive attributes that needs to be masked. Hence the administrator expert will be responsible for manually deciding the masking operation over each attribute being it numeric or alphabetical or categorical. Further, based on masking operation the disclosure proportion determines the percentage of information to be disclosed by each sensitive attribute after masking is calculated. Therefore, whether each sensitive attribute is categorized, alphabetized, or numeric, the administrator expert will be responsible for manually selecting the masking operation. Based on the masking operation, the sensitive attribute percentage of information released after masking is now determined.

For numerical and alphabetical attributes, the method provides a privacy factor to mask the number of digits or characters from right to left. The administrator expert needs to decide the number of digits or characters to mask each numerical and alphabetical attribute. Now based on the number of digits or characters masked the disclosure proportion is calculated in equation 6, $$\text{disclosure proportion } \rho = \frac{\text{Total number of characters} - \text{Total number of characters masked}}{\text{Total number of characters}} \quad \text{equation 6}$$

For categorical attributes, the masking operation is based on the generalization tree, which captures a hierarchy of sensitive attribute. Such that the leaf nodes represent the actual values and as go up the level of tree, at each level the values get generalized such that it masks the leaf nodes. The generalization tree for categorical attributes estimating the masking proportion for chosen levels as depicted in FIG. 4B.

Referring to FIG. 4B, the generalization tress for categorical attributes estimating the masking disclosure proportion is defined in selected levels. T leaf nodes representing the actual values are scored as 0 and as go above the tree the number of child nodes for that node is the node score and it adds up eventually. Based on the level that is chosen for generalization value the corresponding disclosure proportion value is computed for the generalization tree where the score of last leaf node by 0 (node which does not have any leaf node of itself) is initialized i, j, k, l, f, g, h are such nodes in the above tree. Move up the tree all the way to root node calculating the score of each node using the below equation 7, $$\text{node score} = \sum \text{childnode scores} + \text{number of leafs} \quad \text{equation 7}$$

Example: node score of node D=(0+0)+2=2.
Now the disclosure proportion (p) is calculated at any node by using equation 8, $$\text{disclosure proportion } \rho \text{ at node} = 1 - \left(\frac{\text{score of node}}{\text{score of root node}}\right) \quad \text{equation 8}$$

Example: ρ at B=1−7/11=0.36, ρ at C=1−2/11=0.81

Referring to the steps of the method 300, at step 312 compute a sensitivity score for the user request based on the vulnerability rating assigned to each sensitive attribute and a cumulative privacy attribute score for the plurality of sensitive attributes over which the masking operation is performed.

Further, for the above example, the cumulative privacy attribute score is computed which is a product of vulnerability rating of each sensitive attribute associated with the user request for which masking is performed and the disclosure proportion.

The cumulative privacy attribute score is defined as the product of its vulnerability rating and the disclosure proportion. This cumulative privacy attribute score quantifies the degree of damage that can be caused by the information disclosed by the attribute after masking (for example, the disclosure proportion <1). The vulnerability rating and the sensitivity score are equal at the disclosure proportion is one, and this value indicates maximum damage can be caused by the disclosure of the sensitive attribute.

Figure 5:
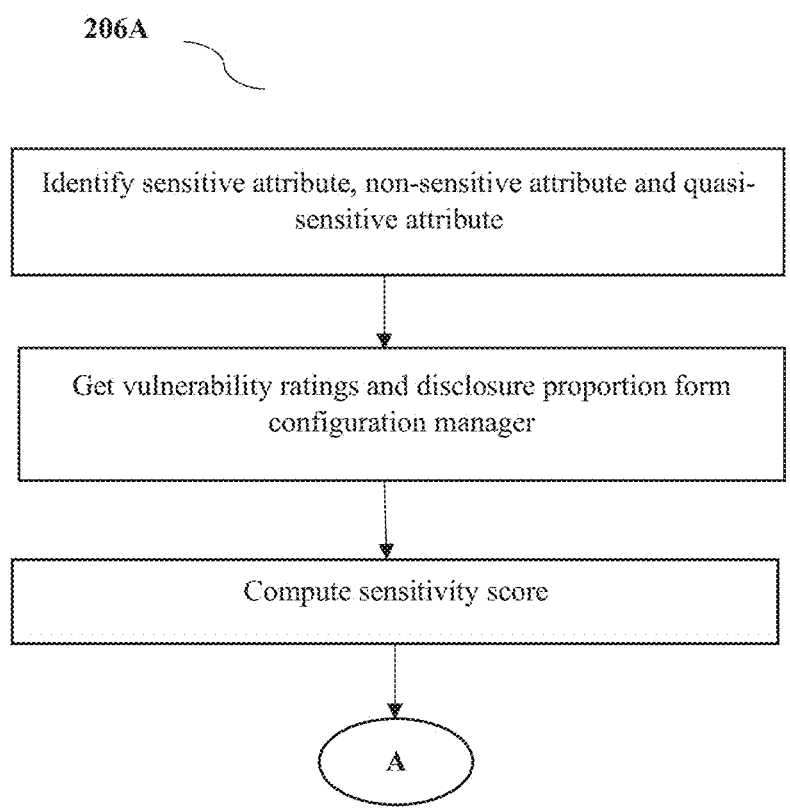
FIG. 5 is an example flow for estimating a sensitivity score of the user request using the system of FIG. 1, in accordance with an embodiment of the present disclosure.

In one embodiment, referring now FIG. 5 the user request with the sensitivity score is a sum of the high risk sensitive attribute and the product of the medium risk quasi-sensitive attribute and the low risk non-sensitive attribute as described in equation 9, $$\text{sensitivity score } S = \text{vulnerability rating} * \text{disclosure proportion } (\rho) \quad \text{equation 9}$$

The high-risk sensitive attribute may be alternatively referred as sensitive attribute comprises Vulnerability Rating [very high (5), high (4)].

The medium risk quasi-sensitive attribute comprises Vulnerability Rating {medium (3), low (2)}. The medium risk quasi-sensitive attribute when disclosed alone does not provide any risk but when combined with certain other attributes may cause damage.

The low risk non-sensitive attribute comprises Vulnerability Rating {very low (1)}, The disclosure of these attributes does not pose any threat.

The sensitivity score is a sum of the high risk sensitive attribute and the product of the medium risk quasi-sensitive attribute and the low risk non-sensitive attribute. The sensitivity score quantifies the degree of damage that can be caused by information disclosed by a single attribute. Some of the attributes (Quasi) disclose more information when present in combination than alone. The method adjusts the sum of sensitivity scores of the quasi attributes by multiplying with a factor that increases exponentially with number of quasi attributes present in the user request as described in equation 10, $$\text{user request sensitivity score} = \sum_{sa} S_{sa} + \sum_{nsa} S_{nsa} + \left((\exp/2)^{\log|qa|}\right) * \sum_{qa} S_{qa} \quad \text{equation 10}$$

Where, sa=sensitive attribute, nsa=non-sensitive attribute, qa=quasi sensitive attribute.

Referring to the steps of the method 300, at step 314 allocate the user request based on the category to the agent among the plurality of agents associated with an agent registry, wherein the agent provides the resolution to the user request with enabled data privacy and minimal data exposure to the agent.

The user request is allocated to the agent among the plurality of agents from the agent registry that are accessible based on previous history. In one implementation, with reference to FIG. 6, the agent allocator 206B allocates the user request to the agent based on the sensitivity of the user request and the associated service level agreement (SLA), in order to achieve the goal of minimal data exposure and complete the task within the specified SLA. The user request may be related to multiple categories such as financial, technical, HR and thereof. The user request should be resolved within a deadline known as SLA which is agreed upon by both service provider and the customer. The user request provides query description along with priority and category to which it belongs. The system invokes allocation method for user request assignment to available agents.

The agent allocator 206B assigns the user request raised by the user for the resolution as each agent caters to multiple categories. For each category the agent serves (Table 2), it has an expertise level assigned based on its skill set and experience. For example, the agent a caters to $C_1$, $C_2$, $C_3$, and $C_4$ categories and has the expertise values E0, E1, E2, E3 respectively for the categories served. Expertise can also be mapped to numerical form {E0=0.1 E1=0.1, E2=0.2 . . . E9=0.9}.

The agent allocator 206B identifies the plurality of agents available from the list containing the agents who does not have any user request in their queue to resolve as described in equation 11 and Table 3.

TABLE 3

Agent allocation

INPUT: user request, Available Agents List, Weights
  1. Get the user request category and the user
  2. For each agent a in Available Agents List
  Get the values of the agent's (a):
    an average resolution time, a success percent, an expertise, a user-usability score, and an agent mis-usability score
  Calculate Agent's(a) Score:
    $a_{score}$ = average resolution time*$W_{RT}$ +
  success percent*$W_{SP}$ + expertise * $W_E$ +
  user mis-usability score*$W_{UM}$ + agent mis-usability score*$W_{OM}$
    1. Allocate the user request to the agent having maximum $a_{score}$
    2. Update the parameters of the allocated agent The available agents list must have at least $T_{AA}$ number of agents. If the number of such agents is less than $T_{AA}$, then this list includes agents who will get free at the earliest to make up the deficit. Selecting the available agent is identified by estimating the maximum time required by the agent to resolve all the user request in queue. Further, these agents are sorted in increasing order of their time required to resolve the user request, then the agent is included from top to complete the available agents list.

$$\text{maximum time required by agent to resolve all tickets} \quad \text{equation 11}$$
$$\text{in its queue} = \sum SLA \text{ of all the ticket in queue} +$$
$$SLA \text{ of ticket the agent is currently working} -$$
$$\text{time lapsed since the agent started working on current ticket}$$

The system first deployment sets the average agent resolution time and the success percentage for each category to 50%. The assigned user request is eventually handled by the agent and adds their history of resolved user request.

Further, an average resolution time is calculated for each agent from the plurality of agents available matching the user request category based on each agent past resolution time The average resolution time captures the average time which an agent takes to resolve the user request of a particular category. The average resolution time of all previous resolution times is determined if the agent has previously resolved at least one category of the user request. The agent gets exposed to the sensitive data through the user request description. The sensitivity score of the user request is calculated using the data risk estimator module.

Further, the method is invoked on arrival of new user request, an available agent list, a data risk estimation of the user request based on privacy settings is computed, and an agent scoring is performed based on allocation parameters having corresponding weights.

Further, weights are determined for a plurality of allocation parameters categorized into at least one of a privacy impacting category and a service level agreement (SLA) impacting category. The privacy impacting category includes at least one of the average resolution time, a success percent, and an expertise. The privacy impacting category includes at least one user-usability score and a mis-usability score.

Success Percent is the percentage of the user request of a particular category an agent has solved without SLA breach out of all the user request of that category allocated to it. If the agent has not been assigned any user request of that category, then initialize success percent with 50%.

Expertise is when each agent has an expertise value assigned to it based on its skill set and experience for each category. The value of expertise is in the range of 0.1 to 1, with 0.1 being least expert and 1 being the most expert.

The user-usability score and the agent mis-usability score is defined at the start of the application these two scores are initialized with 0. With the progress of time as the user request get allocated to agents these scores get updated for each agent from the malicious intent identification module. The notion of the agent mis-usability score is to monitor the possible malicious intent of agents when they resolve the user request.

The weights are computed over a relative importance assigned to each of the parameters governed by their impacting category into at least one of a privacy impacting category and a service level agreement (SLA) impacting category. The weights for the average resolution time $W_{RT}$ is given in equation 12, $$W_{RT} = \left(\frac{s_{rt}}{s_{rt} + s_{sp} + s_E}\right) * W_{SLA} \quad \text{equation 12}$$

Where,
$s_{rt}$=Importance assigned for resolution time
$s_E$=Importance for expertise
$s_{sp}$=Importance for success percent
$W_{SLA}$=weight of service level agreement The weights for the success percent $W_{SP}$ is given in equation 13, $$W_{SP} = \left(\frac{s_{SP}}{s_{rt} + s_{sp} + s_E}\right) * W_{SLA} \quad \text{equation 13}$$

The weights for the user-usability score $W_{UU}$ is given in equation 14, $$W_{UU} = \left(\frac{S_{UU}}{S_{UU} + S_{AM}}\right) * W_{privacy} \quad \text{equation 14}$$

The weights for the agent mis-usability score $W_{AM}$ is given in equation 15, $$W_{AM} = \left(\frac{S_{AM}}{S_{UU} + S_{MM}}\right) * W_{privacy} \quad \text{equation 15}$$

Additionally, each agent with the highest agent score is recognized and each allocation parameter is updated. Further, the user request is assigned to the agent having the highest agent score that matches the user request requirement.

Here, the impact group is assigned a total weight based on the privacy factor (pf), total weight for parameters impacting privacy is given in equation 16, $$(W_{privacy}) = 1 - \frac{pf}{k} \quad \text{equation 16}$$

where k≥pf

The total weight for parameters impacting SLA is represented in equation 17, $$(W_{SLA}) = 1 - W_{privacy} \quad \text{equation 17}$$

As the privacy factor increases, data privacy is enabled by reducing the proportion of each sensitive feature that is disclosed. This further allows for a reduction in the weightage of privacy in allocation that can be decreased as the privacy is getting ensured by masking of the plurality of sensitive attributes.

Referring to the steps of the method 300, at step 316 includes computing via the one or more hardware processors, an agent mis-usability score to assess an insider threat risk of the agent having access to the plurality of sensitive attributes associated with the user request, wherein a feedback alert is notified to autotune the plurality of privacy settings having the agent registry.

The agent monitor 206 computes the agent mis-usability score for each agent X by determining a user profile attribute matrix U, an attribute frequency user matrix F and an attribute vulnerability rating matrix V. The agent monitor 206 provides a feedback and alerts the privacy configuration unit 204 with agents who can turn into malicious threat based on the amount of accumulated information. The system 100 maintains the user profile matrix by each agent namely U. This user profile matrix can be represented as below where each row represents the user who has raised the user request and the columns represents the plurality of sensitive attributes across the application deployed in the service operations. Every matrix entry is between 0 and 1 that represents if that attribute of user was disclosed to the agent or not. An entry of 1 means the attribute was fully disclosed to the agent and an entry of 0 means the attribute was not at all disclosed and frequency matrix that defines how many times the agent has encountered that attribute of a particular user in matrix equation 18, $$X(U, a) = \begin{bmatrix} A1 & A2 & A3 & A4 & A5 \\ 1 & 0 & 1 & 0.7 & 0 \\ 0 & 0 & 0 & 0 & 0 \end{bmatrix} \quad \text{equation 18}$$

The matrix X(U, a) where rows represent users U1, U2, . . . , Ui whose user request are resolved by an agent. The columns represent attributes A1, A2, A3, . . . , Ai. The entry represents whether that attribute was encountered by agent while resolving the user request. An entry of one means attribute Ai for each user Ui was fully disclosed to the agent X, 0.7 means partially disclosed and zero means not disclosed. Matrix V is vulnerability of attributes where the rows represent the attributes and columns are the vulnerability ratings $V_R$ defined for them in matrix equation 19, $$V_R = \begin{bmatrix} A1 & A2 & A3 & A4 & A5 \\ 3 & 2 & 3 & 4 & 1 \\ 0 & 0 & 0 & 0 & 0 \end{bmatrix} \quad \text{equation 19}$$

Matrix $V_R$, rows represent attributes A1, A2, A3, ..., Ai. The columns represent the vulnerability ratings based on the privacy configuration unit 204. Matrix X(user request) shows the number of sensitive and non-sensitive user request resolved by agent X rows represent Attributes A1, A2, A3, ..., Ai in equation 20, $$\begin{bmatrix} \text{sensitive} & \text{non-sensitive} \\ 20 & 12 \end{bmatrix} \quad \text{equation 20}$$

It is also noted that the quasi-sensitive attributes count based on the disclosed user information and possible QIDs count be represented as Ni for each user i, the agent mis-usability is computed as described in equation 21, $$\text{Matrix } R = U \times V \quad \text{equation 21}$$

Given the matrix U, F and V at each agents end the agent mis-usability across users for each agent is computed. Here, two thresholds T and D, the pre-defined threshold T accounts for the values in matrix M where the agent mis-usability Matrix. The agent is placed under surveillance to mitigate the risk of insider threats if the agent mis-usability score is greater than the pre-defined threshold as described in equation 22, $$\text{Matrix } M = \text{row sum} R * \frac{e^{\log N}}{N}, \quad \text{equation 22}$$

where $N$ is the quasi-sensitive scaling factor for row $i$ where N is the quasi-sensitive attributes scaling factor for row i.
Each row in the matrix M which represents the agent mis-usability matrix reveals the user, and a column indicates the agent's score for corresponding user (user mis-usability score). The sum of all the rows, shows the agent mis-usability score for all the served user requests. The agent allocator 206B uses the user-usability score and the agent mis-usability score as the data privacy impacting parameters.

The agent mis-usability matrix for each agent is computed based on the user requests served, the vulnerability rating and the disclosure proportion associated with each sensitive attribute of the user requests, and a pre-defined threshold. The agent is placed under surveillance to mitigate the risk of insider threats when the agent mis-usability score is greater than the pre-defined threshold (T). The agent is also placed under surveillance or monitored if the number of high misuse values exceeds the threshold D (the maximum number of high misuse instances that can be used to gauge each agent's potential). If any row has a score higher than the agent mis-usability threshold T, the corresponding agent must be watched because they may mis-use the information. If the number of rows with scores higher than the agent mis-usability threshold T is greater than the average number of rows, the likelihood of malice is high and otherwise, it is low. To mitigate the risk of high data exposure, the agents with higher user-usability score and the agent mis-usability score are ranked lower in the allocation and hence, not get assigned with any user request.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of providing data privacy in service operations. The embodiment, thus provides method and system for providing data privacy in service operations. Moreover, the embodiments herein further provides quantitative approach for masking by estimating data risk to allocate user request such that insider threat scenarios are mitigated with the agent mis-usability score computation having a feedback mechanism.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for providing data privacy, the method comprising:
   pre-configuring via a one or more hardware processor, a plurality of privacy settings defined by a customer corresponding to one or more service operations in a service operations;
   receiving via the one or more hardware processors, a user request for a service comprising a plurality of sensitive attributes, wherein the user request is classified into a category among a plurality of categories, and wherein the user request is assigned to an agent among a plurality of agents to provide resolution;
   assigning via the one or more hardware processors, a vulnerability rating among a plurality of vulnerability ratings to each sensitive attribute among the plurality of sensitive attributes of the user request;
   estimating via the one or more hardware processors, a disclosure proportion for the plurality of sensitive attributes based on the vulnerability rating corresponding to each sensitive attribute and a privacy factor;
   performing via the one or more hardware processors, one of,
      a masking operation over the plurality of sensitive attributes based on the disclosure proportion when at least one sensitive attribute is a numerical character, wherein the disclosure proportion determines a total number of numerical characters to be masked, and
      selecting a node from a generalization tree close to the disclosure proportion when at least one sensitive attribute is a non-numerical character;
   computing via the one or more hardware processors, a sensitivity score for the user request based on the vulnerability rating assigned to each sensitive attribute and a cumulative privacy attribute score for the plurality of sensitive attributes over which the masking operation is performed;
   allocating via the one or more hardware processors, the user request based on the category to the agent among the plurality of agents associated with an agent registry, wherein the agent provides the resolution to the user request with enabled data privacy and minimal data exposure to the agent; and
   computing via the one or more hardware processors, an agent mis-usability score to assess an insider threat risk of the agent having access to the plurality of sensitive attributes associated with the user request, wherein a feedback alert is notified to autotune the plurality of privacy settings having the agent registry;
   wherein allocating the user request to the agent based on the category comprises:
   determining the plurality of agents from the agent registry available to service the user request based on previous history;
   calculating an average resolution time for each agent from the plurality of agents available matching the user request category based on each agent past resolution time;
   determining weights for a plurality of allocation parameters categorized into at least one of a privacy impacting category and a service level agreement (SLA) impacting category, wherein the privacy impacting category includes a user-usability score and the agent mis-usability score, wherein the service level agreement (SLA) impacting category includes an average resolution time, a success percent, and an expertise;
   obtaining the values of each allocation parameter for each agent based on the category of the user request;
   calculating an agent score for each available agent based on the plurality of allocation parameters with its associated weights; and
   identifying each agent having maximum agent score and updating the plurality of allocation parameters.

2. The processor-implemented method as claimed in claim 1, wherein the privacy factor is a numerical value ranging between zero and one based on the disclosure proportion exposure to the agent, wherein a least risk is tagged to the agent if the privacy factor is close to one and a high risk is tagged to the agent if the privacy factor is close to zero.

3. The processor-implemented method as claimed in claim 1, wherein estimating the disclosure proportion for the plurality of sensitive attributes comprises:
   obtaining the vulnerability rating of each sensitive attribute associated with the user request;
   determining the privacy factor for the user request; and
   generating an optimization model to compute the disclosure proportion for the plurality of sensitive attributes associated with the user request based on the privacy factor.

4. The processor-implemented method as claimed in claim 1, wherein the vulnerability rating includes at least one of a high risk sensitive attribute, a medium risk quasi-sensitive attribute, and a low risk non-sensitive attribute.

5. The processor-implemented method as claimed in claim 1, wherein the privacy attribute score is a product of vulnerability rating of each sensitive attribute and the disclosure proportion.

6. The processor-implemented method as claimed in claim 1, wherein the sensitivity score is a sum of the high risk sensitive attribute and the product of the medium risk quasi-sensitive attribute and the low risk non-sensitive attribute.

7. The processor-implemented method as claimed in claim 1, wherein the agent mis-usability score for each agent is computed based on the agent score, the vulnerability rating associated with each sensitive attribute of the user request, and a pre-defined threshold, and wherein the agent is placed under surveillance to mitigate the risk of insider threats when the agent mis-usability score is greater than the pre-defined threshold.

8. A system for providing data privacy, comprising:
a memory storing instructions;
one or more communication interfaces; and
one or more hardware processors coupled to the memory via the one or more communication interfaces 18744827, wherein the one or more hardware processors are configured by the instructions to:
pre-configure a plurality of privacy settings defined by a customer corresponding to one or more service operations in a service operations;
receive a user request for a service comprising a plurality of sensitive attributes, wherein the user request is classified into a category among a plurality of categories, and
wherein the user request is assigned to an agent among a plurality of agents to provide resolution;
assign a vulnerability rating among a plurality of vulnerability ratings to each sensitive attribute among the plurality of sensitive attributes of the user request;
estimate a disclosure proportion for the plurality of sensitive attributes based on the vulnerability rating corresponding to each sensitive attribute and a privacy factor;
perform one of a masking operation over the plurality of sensitive attributes based on the disclosure proportion when at least one sensitive attribute is a numerical character, wherein the disclosure proportion determines a total number of numerical characters to be masked, and select a node from a generalization tree close to the disclosure proportion when at least one sensitive attribute is a non-numerical character;
compute a sensitivity score for the user request based on the vulnerability rating assigned to each sensitive attribute and a cumulative privacy attribute score for the plurality of sensitive attributes over which the masking operation is performed;
allocate the user request based on the category to the agent among the plurality of agents associated with an agent registry, wherein the agent provides the resolution to the user request with enabled data privacy and minimal data exposure to the agent; and
compute an agent mis-usability score to assess an insider threat risk of the agent having access to the plurality of sensitive attributes associated with the user request, wherein a feedback alert is notified to autotune the plurality of privacy settings having the agent registry;
wherein allocating the user request to the agent based on the category comprises:
determining the plurality of agents from the agent registry available to service the user request based on previous history;
calculating an average resolution time for each agent from the plurality of agents available matching the user request category based on each agent past resolution time;
determining weights for a plurality of allocation parameters categorized into at least one of a privacy impacting category and a service level agreement (SLA) impacting category, wherein the service level agreement (SLA) impacting category includes an average resolution time, a success percent, and an expertise, wherein the privacy impacting category includes a user-usability score and the agent mis-usability score;
obtaining the values of each allocation parameter for each agent based on the category of the user request;
calculating an agent score for each available agent based on the plurality of allocation parameters with its associated weights; and
identifying each agent having maximum agent score and updating the plurality of allocation parameters.

9. The system as claimed in claim 8, wherein the privacy factor is a numerical value ranging between zero and one based on the disclosure proportion exposure to the agent, wherein a least risk is tagged to the agent if the privacy factor is close to one and a high risk is tagged to the agent if the privacy factor is close to zero.

10. The system as claimed in claim 8, wherein estimating the disclosure proportion for the plurality of sensitive attributes comprises:
obtain the vulnerability rating of each sensitive attribute associated with the user request, wherein the vulnerability rating includes at least one of a high risk sensitive attribute, a medium risk quasi-sensitive attribute, and a low risk non-sensitive attribute;
determine the privacy factor for the user request; and
generate an optimization model to compute the disclosure proportion for the plurality of sensitive attributes associated with the user request based on the privacy factor.

11. The system as claimed in claim 8, wherein the privacy attribute score is a product of vulnerability rating of each sensitive attribute and the disclosure proportion.

12. The system as claimed in claim 8, wherein the sensitivity score is a sum of the high risk sensitive attribute and the product of the medium risk quasi-sensitive attribute and the low risk non-sensitive attribute.

13. The system as claimed in claim 8, wherein the agent mis-usability score for each agent is computed based on the agent score, the vulnerability rating associated with each sensitive attribute of the user request, and a pre-defined threshold, and wherein the agent is placed under surveillance to mitigate the risk of insider threats when the agent mis-usability score is greater than the pre-defined threshold.

14. One or more non-transitory machine-readable information storage mediums comprising one or more instructions which when executed by one or more hardware processors cause:
pre-configuring a plurality of privacy settings defined by a customer corresponding to one or more service operations in a service operations;
receiving a user request for a service comprising a plurality of sensitive attributes, wherein the user request is classified into a category among a plurality of categories, and wherein the user request is assigned to an agent among a plurality of agents to provide resolution;
assigning a vulnerability rating among a plurality of vulnerability ratings to each sensitive attribute among the plurality of sensitive attributes of the user request;

estimating a disclosure proportion for the plurality of sensitive attributes based on the vulnerability rating corresponding to each sensitive attribute and a privacy factor;

performing one of,
- a masking operation over the plurality of sensitive attributes based on the disclosure proportion when at least one sensitive attribute is a numerical character, wherein the disclosure proportion determines a total number of numerical characters to be masked, and
- selecting a node from a generalization tree close to the disclosure proportion when at least one sensitive attribute is a non-numerical character, computing a sensitivity score for the user request based on the vulnerability rating assigned to each sensitive attribute and a cumulative privacy attribute score for the plurality of sensitive attributes over which the masking operation is performed;

allocating the user request based on the category to the agent among the plurality of agents associated with an agent registry, wherein the agent provides the resolution to the user request with enabled data privacy and minimal data exposure to the agent; and computing an agent mis-usability score to assess an insider threat risk of the agent having access to the plurality of sensitive attributes associated with the user request, wherein a feedback alert is notified to autotune the plurality of privacy settings having the agent registry;

wherein allocating the user request to the agent based on the category comprises:

determining the plurality of agents from the agent registry available to service the user request based on previous history;

calculating an average resolution time for each agent from the plurality of agents available matching the user request category based on each agent past resolution time;

determining weights for a plurality of allocation parameters categorized into at least one of a privacy impacting category and a service level agreement (SLA) impacting category, wherein the service level agreement (SLA) impacting category includes an average resolution time, a success percent, and an expertise, wherein the privacy impacting category includes a user-usability score and the agent mis-usability score;

obtaining the values of each allocation parameter for each agent based on the category of the user request;

calculating an agent score for each available agent based on the plurality of allocation parameters with its associated weights; and identifying each agent having maximum agent score and updating the plurality of allocation parameters.

15. The one or more non-transitory machine-readable information storage mediums of claim 14, wherein the privacy factor is a numerical value ranging between zero and one based on the disclosure proportion exposure to the agent, wherein a least risk is tagged to the agent if the privacy factor is close to one and a high risk is tagged to the agent if the privacy factor is close to zero.

16. The one or more non-transitory machine-readable information storage mediums of claim 14, wherein estimating the disclosure proportion for the plurality of sensitive attributes comprises:

obtaining the vulnerability rating of each sensitive attribute associated with the user request, wherein the vulnerability rating includes at least one of a high risk sensitive attribute, a medium risk quasi-sensitive attribute, and a low risk non-sensitive attribute;

determining the privacy factor for the user request; and generating an optimization model to compute the disclosure proportion for the plurality of sensitive attributes associated with the user request based on the privacy factor.

17. The one or more non-transitory machine-readable information storage mediums of claim 14, wherein the privacy attribute score is a product of vulnerability rating of each sensitive attribute and the disclosure proportion.

* * * * *